US006885395B1

United States Patent
Rabbani et al.

(10) Patent No.: US 6,885,395 B1
(45) Date of Patent: Apr. 26, 2005

(54) SELECTIVELY ADJUSTING THE RESOLUTION LEVELS OR THE QUALITY LEVELS OF DIGITAL IMAGES STORED IN A DIGITAL CAMERA MEMORY

(75) Inventors: Majid Rabbani, Pittsford, NY (US); Rajan L. Joshi, Rochester, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 797 days.

(21) Appl. No.: 09/656,564

(22) Filed: Sep. 7, 2000

Related U.S. Application Data
(60) Provisional application No. 60/207,690, filed on May 26, 2000.

(51) Int. Cl.[7] .................................................. H04N 5/76
(52) U.S. Cl. ..................................................... 348/231.1
(58) Field of Search .......................... 348/231.1, 231.2, 348/231.3, 231.99, 333.11

(56) References Cited

U.S. PATENT DOCUMENTS

| | | | |
|---|---|---|---|
| 5,018,017 A | * 5/1991 | Sasaki et al. | 348/231.3 |
| 5,249,053 A |   9/1993 | Jain | |
| 5,493,335 A | * 2/1996 | Parulski et al. | 348/231.6 |
| 6,381,280 B1 | * 4/2002 | Lynch et al. | 375/240.19 |
| 6,393,578 B1 | * 5/2002 | Swidler et al. | 713/600 |
| 6,429,896 B1 | * 8/2002 | Aruga et al. | 348/231.99 |
| 6,539,169 B1 | * 3/2003 | Tsubaki et al. | 386/109 |

FOREIGN PATENT DOCUMENTS

| | | |
|---|---|---|
| EP | 1134968 A2 | 9/2001 |
| GB | 2365180 A | 2/2002 |
| JP | 09128376 | 5/1997 |
| JP | 10145737 | 5/1998 |
| JP | 11252337 | 9/1999 |

OTHER PUBLICATIONS

PC Card Standard Release 2.0, published by the Personal Computer Memory Card International Association, Sunnyvale, California, Sep. 1991.
CompactFlash Specification Version 1.3, published by the CompactFlash Association, Palo Alto, California, Aug. 5, 1998.
Comparative Study of Wavelet and DCT Decompositions with Equivalent Quantization and Encoding Strategies for Medical Images, by Paul W. Jones et al., SPIE vol. 2431, pp. 571–582.

* cited by examiner

Primary Examiner—Wendy R. Garber
Assistant Examiner—Rashawn N Tillery
(74) Attorney, Agent, or Firm—Pamela R. Crocker

(57) ABSTRACT

A method for selectively adjusting the resolution levels or the quality levels of digital images stored in a memory of a digital camera having a predetermined memory space includes capturing a first image and storing the captured first image at a specific resolution level or quality level. The resolution level or quality level of the stored first image is adjusted based on the available memory space in the digital camera memory so that a subsequent captured image can be stored. A subsequent image is then captured, and the captured subsequent image is stored with the adjusted first image.

27 Claims, 11 Drawing Sheets

SELECTIVELY ADJUSTING THE RESOLUTION LEVELS OR THE QUALITY LEVELS OF DIGITAL IMAGES STORED IN A DIGITAL CAMERA MEMORY

CROSS REFERENCE TO RELATED APPLICATIONS

This application claims benefit of Provisional No. 60/207,690, filed May 26, 2000.

Reference is made to commonly-assigned U.S. patent application Ser. No. 09/512,731, filed Feb. 24, 2000, entitled "Visually Progressive Ordering Of Compressed Subband Bit-Planes And Rate-Control Based On This Ordering" to Joshi et al.; commonly-assigned U.S. patent application Ser. No. 09/579,689, filed May 26, 2000, entitled "Producing A Compressed Digital Image Organized Into Layers Corresponding To Increasing Visual Quality Levels And Providing Rate-Control Of Such Compressed Digital Image" to Joshi et al.; and commonly-assigned U.S. patent application Ser. No. 09/579,996, filed May 26, 2000, entitled "Producing A Digital Image Organized Into Layers Having Information Relating To Different Viewing Conditions And Resolutions" to Joshi et al., the disclosures of which are herein incorporated by reference.

FIELD OF INVENTION

This invention describes a method for selectively adjusting the resolution levels or the quality levels of digital images stored in a memory of a digital camera.

BACKGROUND OF THE INVENTION

Current digital cameras, such as the Kodak DC265 camera, capture images with a single-chip color CCD image sensor, process the images to provide "finished" RGB images, compress the images using JPEG compression, and store the images on a removable memory card. As depicted in FIG. 1, the DC265 allows the user to select different resolution settings, a high resolution setting that JPEG compresses all of the 1536×1024 pixels provided by the CCD sensor and a VGA setting that subsamples the CCD image to 640×480 pixels prior to JPEG compression. The DC265 also provides various quality settings (e.g. good, better, best) that use different JPEG quantizer tables to produce images with different files sizes, with the larger file sizes providing higher image quality. The DC265 also allows the user to create and select different folders into which images are stored. Once the card is filled with compressed image data, the images must be downloaded to a PC (assuming one is accessible) and deleted from the card, or the card must be replaced with another card (assuming the user has purchased and brought along another card). Otherwise, in order to be able to take more pictures, the user must delete some of the previously taken pictures, losing them forever.

The problem with this prior art camera is that the user must decide which quality setting to use prior to taking the picture. Once the memory card is full or nearly full, the only option is to delete pictures from the memory card. So, before taking pictures, the user must decide whether the images are "important" enough to be stored at a high quality, or whether it is more important to conserve memory card space, thus limiting the quality of the compressed images.

SUMMARY OF THE INVENTION

Accordingly, it is an object of the present invention to provide a method which enables a user of a digital camera to select a resolution level or a quality level for an image prior to its capture.

It is another object of the present invention to enable the user to selectively reduce the file size of the captured image, by reducing either the resolution level or the quality level, of at least some of the stored images after the images have been captured in order to free up memory space to store additional captured images.

These objects are achieved by a method for selectively adjusting the resolution levels or the quality levels of digital images stored in a memory of a digital camera having a predetermined memory space, comprising the steps of:

(a) capturing a first image and storing the captured first image at a specific resolution level or quality level;

(b) adjusting the resolution level or quality level of the stored first image based on the available memory space in the digital camera memory so that a subsequent captured image can be stored; and (c) capturing a subsequent image and storing the captured subsequent image with the adjusted first image.

ADVANTAGES OF THE INVENTION

The present invention provides a method which enables a user of a digital camera to select a resolution level or a quality level for an image prior to image capture. By enabling the user to selectively reduce the file size of stored images after they have been captured by reducing either the resolution level or the quality level, memory space is freed up so that additional captured images can be stored.

DETAILED DESCRIPTION OF THE DRAWINGS

DETAILED DESCRIPTION OF THE INVENTION

The present invention enables a user of a digital camera to select a resolution and a quality level for an image prior to its capture. Furthermore, it enables the user to selectively reduce the file size, by reducing either the resolution level or the; quality level of some or all of the stored images after they have been captured. This frees up memory space to capture additional images. When the initial images are captured, they are all stored at maximum quality for the resolution specified, until the remaining capacity of the memory card reaches a threshold. At this point, each time a new picture is taken, the quality of some of the previously captured images is reduced, while maintaining their resolution, by deleting their higher-order quality layers, so that the freed-up memory can be re-used to store the new picture. Once the memory is filled and no memory can be freed without compromising the minimum expected quality or the resolution of the stored images, the user can reduce the quality level or resolution settings of any given image to make room for more pictures.

Figure 1:
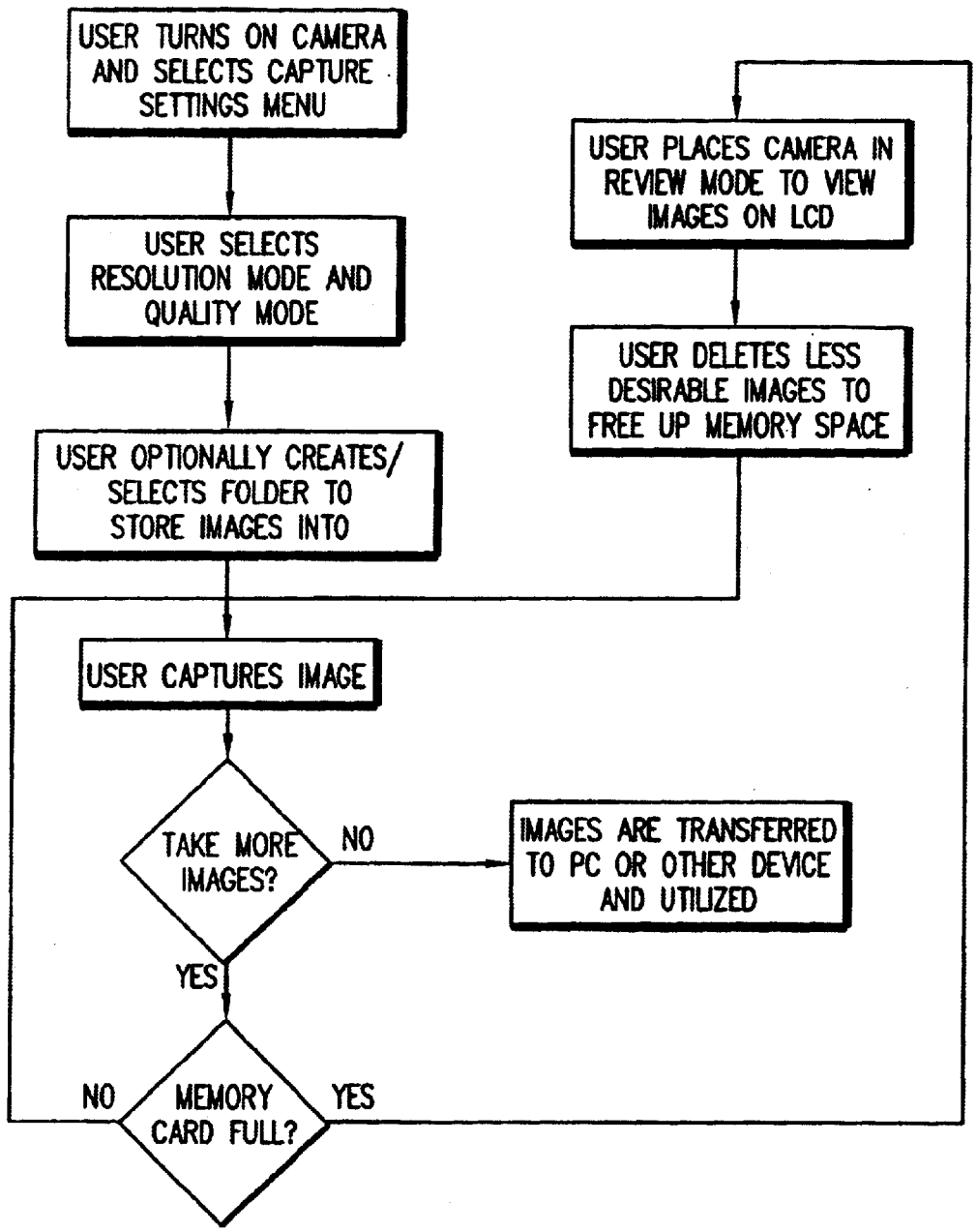
FIG. 1 is a flow diagram of a prior art method of image quality selection and deletion using a digital camera.
Figure 2:
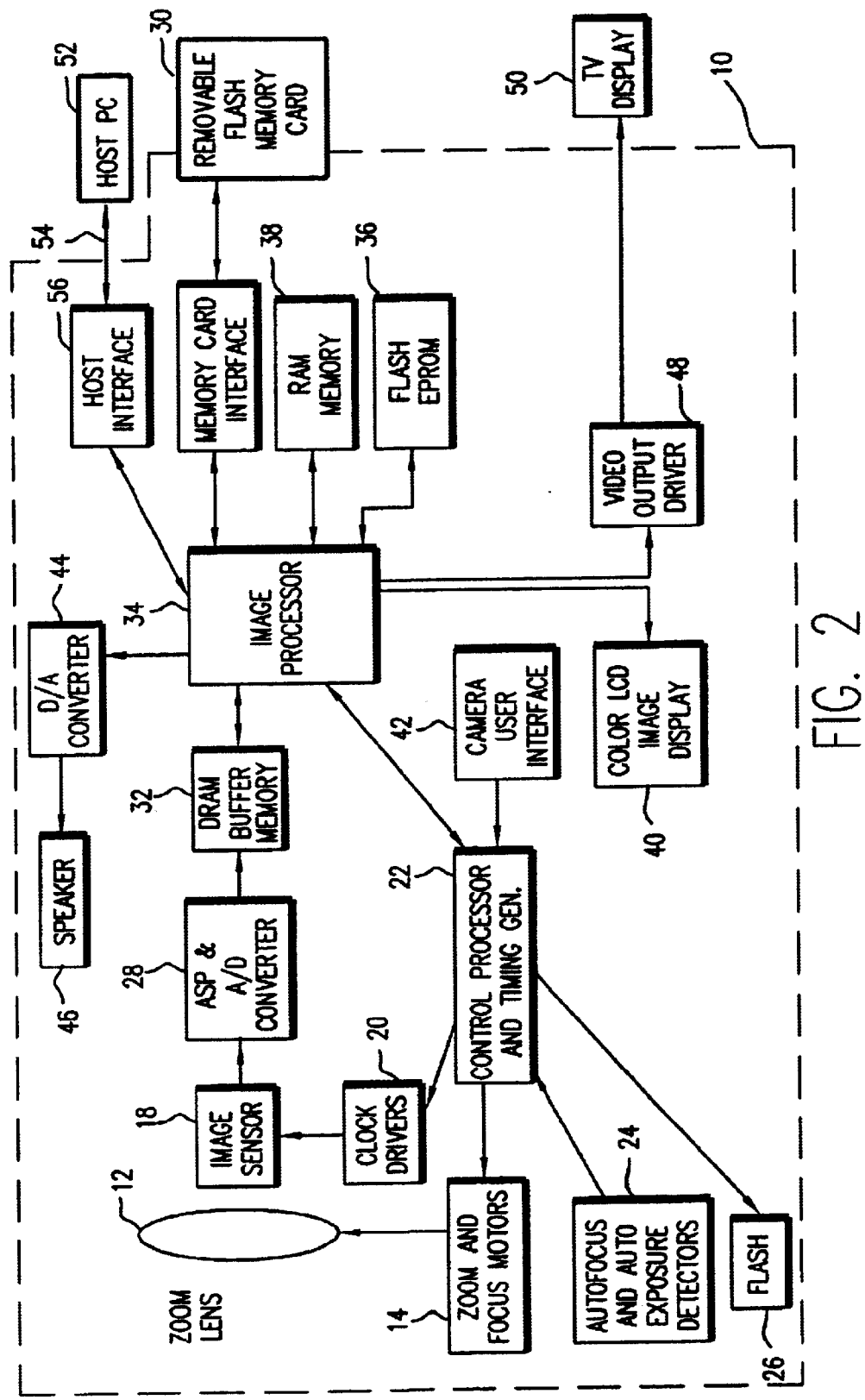
FIG. 2 is a block diagram of a digital camera which can utilize the present invention.

The present invention can be incorporated into a digital camera 10 shown in FIG. 2. The digital camera 10 produces digital images that are stored on a removable memory card 30. The digital camera 10 includes a zoom lens 12 having zoom and focus motor drives 14 and an adjustable aperture and shutter (not shown). The user composes the image using an optical viewfinder (not shown) and a zoom lens control switch (not shown). The zoom lens 12 focuses light from a scene (not shown) on an image sensor 18, for example, a single-chip color charge-coupled device (CCD), using the well-known Bayer color filter pattern. The image sensor 18 is controlled by clock drivers 20. The zoom and focus motor drives 14 and the clock drivers 20 are controlled by control signals supplied by a control processor and timing generator circuit 22. When the user depresses a shutter button (not shown) to take a picture, the control processor and timing generator circuit 22 receives inputs from autofocus and autoexposure detectors 24 and controls a flash 26. The analog output signal from the image sensor 18 is amplified and converted to digital data by an analog signal processor (ASP) and analog-to-digital (A/D) converter circuit 28. The digital data is stored in a DRAM buffer memory 32 and subsequently processed by a processor 34 controlled by firmware stored in a reprogrammable memory, such as a Flash EPROM 36.

The processed digital image file is provided to a memory card interface 38 which stores the digital image file on the removable memory card 30 or on another type of digital memory device, such as a floppy disk or magnetic hard drive. The removable memory card 30, which is well-known to those skilled in the art, can include, for example, a memory card adapted to the PCMCIA card interface standard, as described in the *PC Card Standard, Release* 2.0, published by the Personal Computer Memory Card international Association, Sunnyvale, Calif., September 1991. The removable memory card 30 can also be adapted to the Compact Flash interface standard, such as described in the *CompactFlash Specification Version* 1.3, published by the CompactFlash Association, Palo Alto, Calif., Aug. 5, 1998, or to other memory devices such as the well-known SSFDC (Solid State Floppy Disc Card) or Memory Stick formats.

The processor 34 performs color interpolation followed by color and tone correction, in order to produce rendered sRGB image data. The processor 34 can include internal buffer memory to store a portion of the image, or to store one or more images. Alternatively, the processor 34 can use a separate external memory. The rendered sRGB image data is then compressed using a compression system such as JPEG2000 compression, and stored as a JPEG image file on the removable memory card 30. The processor 34 also provides a lower resolution or "thumbnail" size image data to a color image display 40, such as a color liquid crystal display (LCD), which displays the captured image for the user to review. A camera user interface 42 is used to control the digital camera 10. The camera user interface 42, together with text and icons displayed on the image display 40, forms the camera graphical user interface (GUI). This GUI is controlled by the user interface portion of the firmware stored in the Flash EPROM 36. The digital camera 10 can also include a digital-to-analog (D/A) converter 44 and a miniature speaker 46 which makes audible sounds when a new picture is taken, or when the user changes modes or advances to review the next stored image. The digital camera 10 can also include a video output driver 48 which connects to a TV display 50, such as an NTSC format home television, for displaying the captured images on the TV display 50.

After a series of images has been taken by the digital camera 10 and stored on the removable memory card 30, the removable memory card 30 can be inserted into a memory card reader (not shown) in a host computer 52. Alternatively, an interface cable 54 can be used to connect between a host interface 56 in the digital camera 10 and a corresponding camera interface in the host computer 52. The interface cable 54 may conform to, for example, the well-know universal serial bus (USB) interface specification.

Figures 3, 3A, 3B:
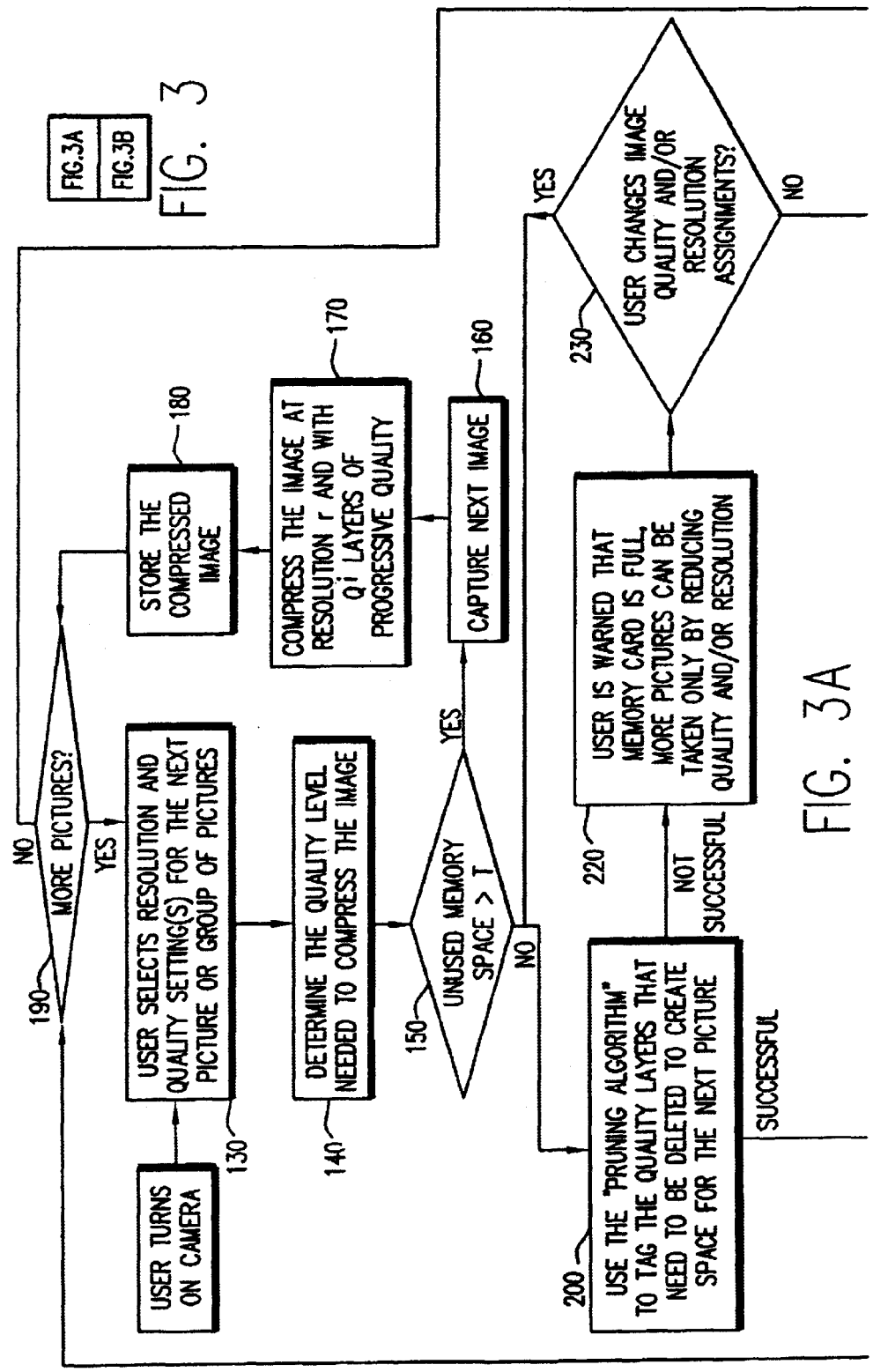
FIG. 3 is a flow diagram of process of the present invention.
Figure 3B:
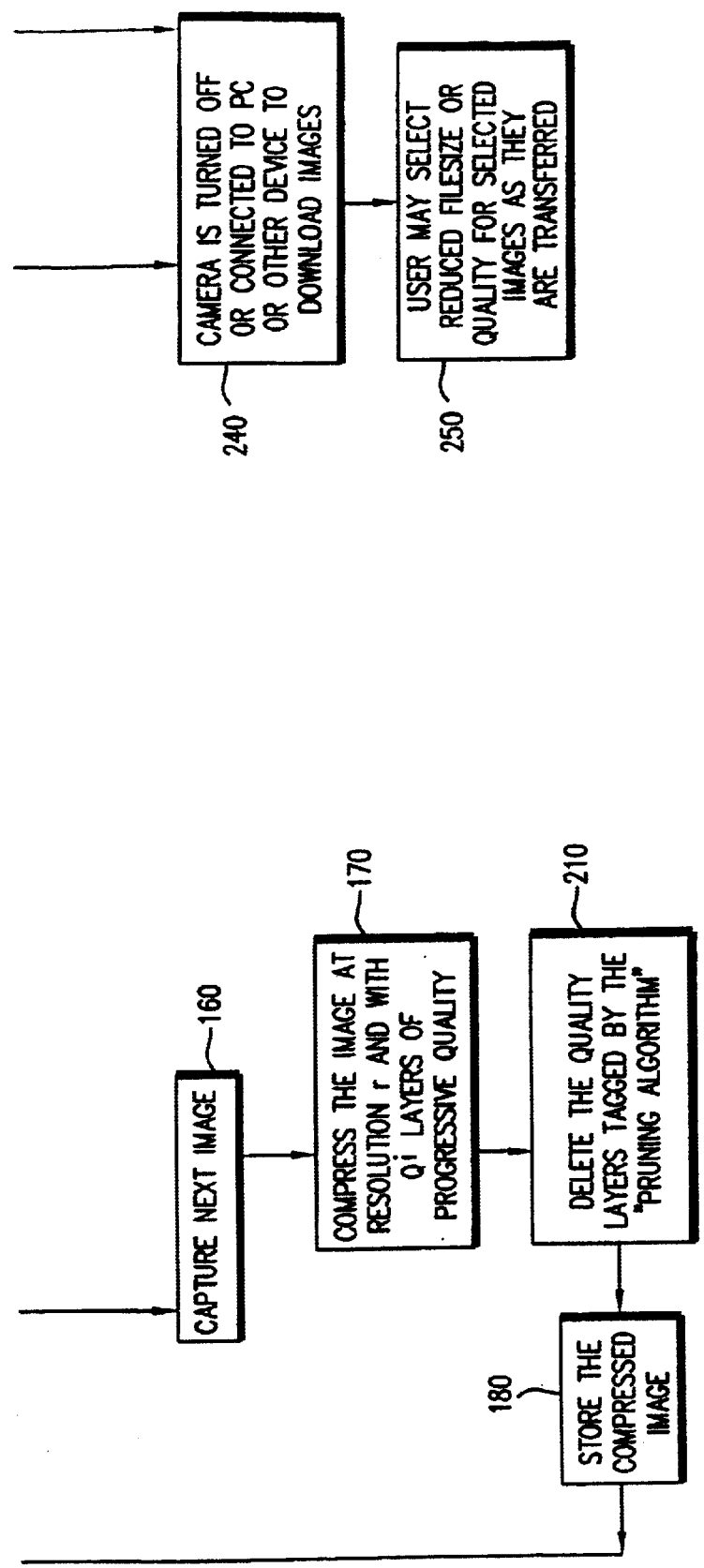

FIG. 3 depicts a flow diagram of the process of the present invention. In one embodiment of the present invention, the camera user interface 42 includes the ability for the user to select a resolution level r and a quality range $Q_{min}$ to $Q_{max}$ for each image or for a group of images prior to their capture (block 130). The $Q_{min}$ parameter specifies the lowest quality that the user would tolerate for that image while the $Q_{max}$ parameter specifies the highest quality that the user might ever need for the image. Alternatively, the user can specify the resolution level r and only the minimum quality level $Q_{min}$, and the camera will assign a maximum quality level $Q_{max}$ according to some procedure, e.g., by incrementing $Q_{min}$ by a pre-specified value. In another alternative embodiment, both the resolution level and the minimum quality level are set during camera manufacture, so that the user is not required to select these levels.

The captured images are compressed using a compression algorithm that is capable of organizing the compressed bit stream into a number of quality layers. Each quality layer is associated with a resolution. The resolution associated with a quality layer signifies that the quality layer may not contain compressed data corresponding to higher resolutions. The quality layers that are associated with the same resolution are grouped together and labeled with a series of increasing numbers, e.g., from 1 to 5, where 1 corresponds to the lowest possible quality and 5 corresponds to the highest. Each resolution can contain the same number of quality layers or it can contain a different number of quality layers depending on the application. For a given resolution r, the parameter $Q^i$ denotes the current quality level of the compressed image, i.e., the compressed bit stream that represents the image contains all of the quality layers for all of the resolutions up to r−1, and contains only quality layers 1 through $Q^i$ for resolution r. For an image i, the quality difference parameter $Q^i_{diff}$ is defined as the difference between its current quality level $Q^i$ and its associated minimum allowable quality level $Q^i_{min}$.

One example of a compression algorithm that offers such flexibility is the JPEG2000 image compression algorithm, as described in ISO/IEC JTC1/SC29 WG1 N1523, JPEG 2000 Part I Committee Draft Version 1.0, December 1999. The specific procedure used to form the quality layers of a compressed JPEG2000 bit stream and to associate a resolution with each quality layer is described in more detail later, and is disclosed in commonly-assigned U.S. patent application Ser. No. 09/579,996.

Figure 4:
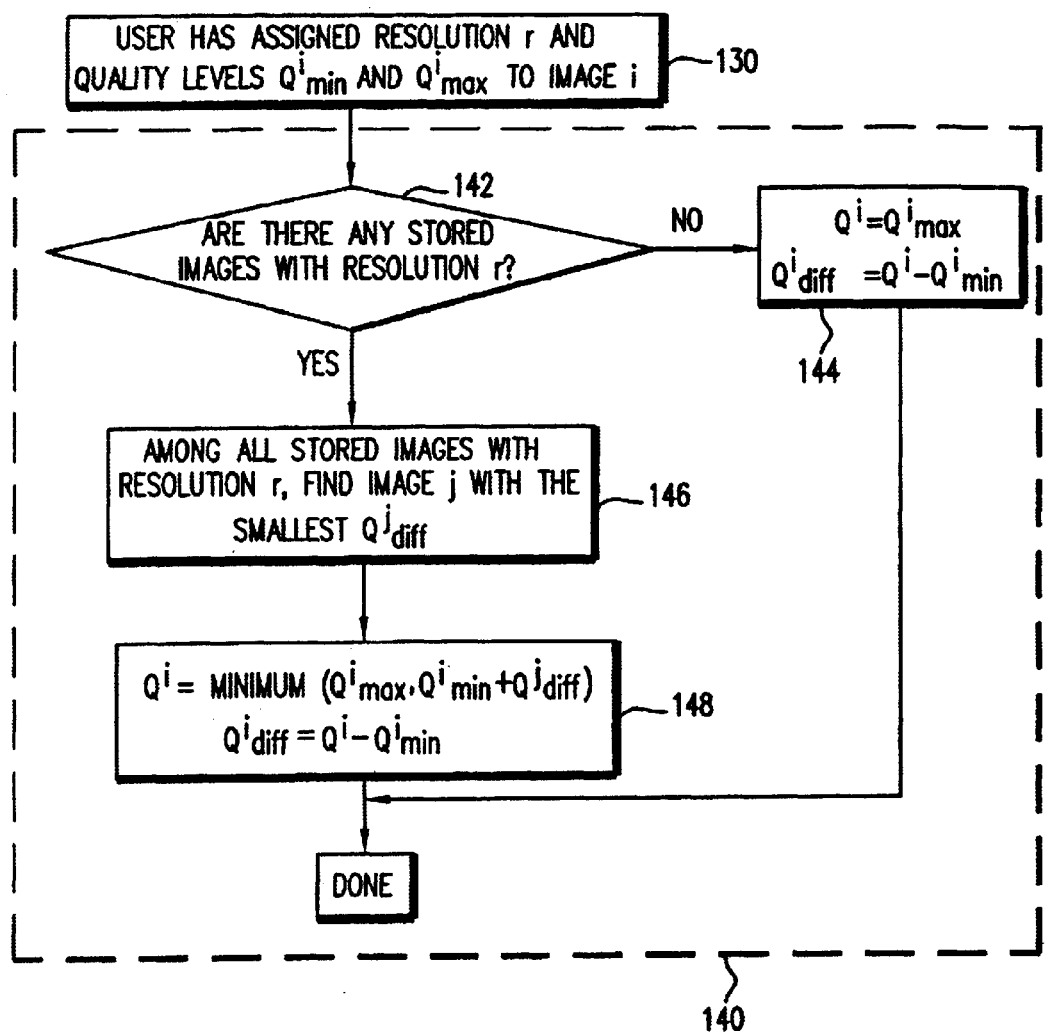
FIG. 4 is a flow diagram for determining the quality level for compressing an image.

Next, an appropriate quality level $Q^i$ to be used for the compression of the image based on user input and the quality of existing images in the camera is determined (block 140). A method of determining an appropriate quality level $Q^i$ to compress the image is depicted in FIG. 4. The user has already specified the resolution level r and a quality parameter range $Q^i_{min}$ to $Q^i_{max}$ for the ith image to be compressed (block 130). First, it is checked if there are any other images stored in the camera with resolution r (block 142). If no, i.e., if the image i is the first occurrence of an image with resolution r, $Q^i$ is set to $Q^i_{max}$ and the quality difference parameter $Q^i_{diff}$ is updated (block 144). If other compressed images with resolution r already exist in the camera memory, the set of images with resolution r is searched to find the image j with the smallest quality difference parameter, $Q^j_{diff}$ (block 146). The quality level $Q^i$ is then determined so that the quality difference for image i is $Q^j_{diff}$ (block 148). However, if that makes the quality level $Q^i$ larger than $Q^i_{max}$, $Q^i$ is set to $Q^i_{max}$. This ensures that the image is compressed to a quality no lower than the lowest quality stored image for that resolution while at the same time not exceeding the maximum specified quality. Other procedures for determining the $Q^i$ value can be used depending on the application. For example; the quality level for image i can be set so that it is compressed to the highest quality difference (instead of the lowest quality difference) of all images with resolution r.

The user then commences the image capture process. Referring again to FIG. 3, the camera determines if the amount of unused memory space is large enough to accommodate the next image (block 150). For example, the amount of unused memory can be compared to a pre-specified threshold T, which can be set to be slightly larger than the memory needed to store an image at the highest resolution and quality level. If memory is available, the next image is captured (block 160), compressed at resolution r with $Q^i$ levels of progressive quality (block 170) and stored in the memory (block 180).

The user will continue to capture images in this manner until he/she either decides that no more pictures need to be taken (block 190) or the available memory drops below a pre-specified threshold T. Once the amount of unused memory space is less than T (block 150), a pruning algorithm (block 200) is invoked to determine the particular quality levels of the particular stored images that can be deleted to create space for the next picture. One embodiment of such a pruning algorithm is described in FIG. 5.

Figure 5:
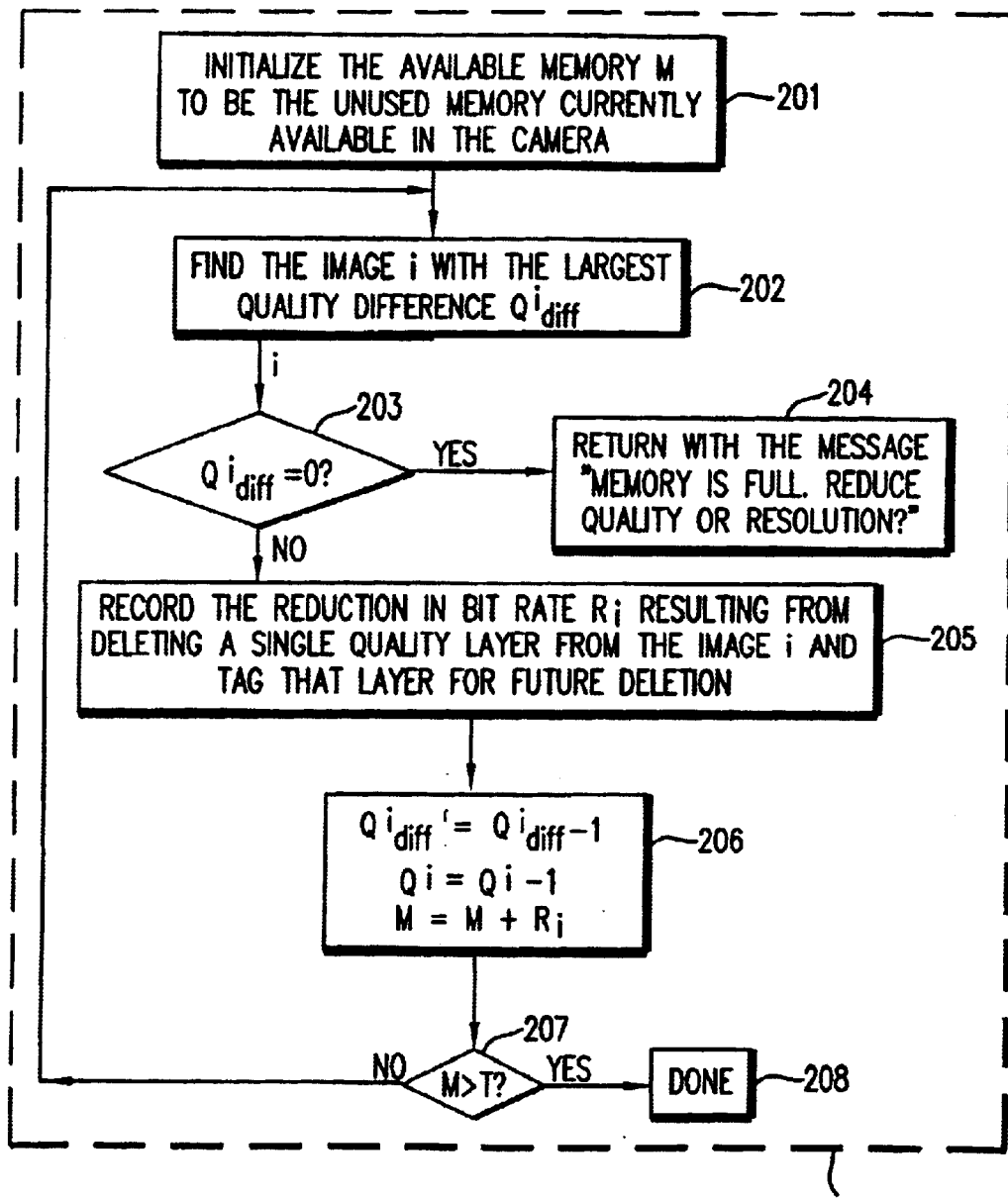
FIG. 5 is a flow diagram of the pruning algorithm shown in FIG. 3.

As shown in FIG. 5, the available memory M is initialized to be the amount of unused memory that is currently available in the digital camera 10 (block 201). Next, the image with the highest quality difference parameter is identified (block 202) and this highest quality difference parameter is compared to zero (block 203). If it is zero, it implies that all images have been pruned to the lowest allowable quality by the user and no further pruning is possible unless the user is willing to reduce the resolution or the quality levels associated with some or all of the images. Hence a message to this effect is generated (block 204). The procedure used for reducing the resolution or the quality of already stored images is explained later. Also, in the case that several images share the highest nonzero quality difference parameters, a tie breaking procedure can be used to choose one of them. For example, the highest resolution image can be chosen first because it is likely to free up the largest amount of memory space. Alternatively, other tie breaking procedures can be used.

It should be noted that the compression algorithm has organized the compressed bit stream into a series of quality layers. The number of bytes used to represent the compressed data corresponding to each quality layer is known. At this point, the amount of memory that is freed up by deleting the highest quality layer for this image, $R_i$, is recorded and the compressed bytes comprising that quality layer are tagged for future deletion (block 205). Both the quality level parameter and the quality difference parameter for image i are reduced by one to reflect the deletion of the highest quality layer and $R_i$ is added to the total available memory M (block 206). The available memory is compared to the threshold T (block 207), and if it is larger, the pruning algorithm is exited (block 208). Otherwise, the pruning process continues until either the available memory exceeds the; threshold T or no further pruning is possible (block 204).

The number of bytes used to represent the compressed data corresponding to each quality layer for each stored image can be represented in a table, for example, such as Table I shown below. For purposes of illustration, Table I depicts a variety of quality levels at the same resolution. As each newly captured image is compressed, the amount of memory required to store each quality level increment for that compressed image is added to the table. At a given quality level, the total file size of the stored compressed image is equal to the sum of the table entries for quality levels up to and including that given quality level. For example, for Quality Level 3 of Image 1 shown in Table 1, the total file size of the stored compressed image would be 260 Kbytes. The table can be stored in Flash EPROM 28 of the digital camera 10, or can be stored on the removable memory card 30.

This table is used during the pruning operation to perform memory management. The table data is accessed by the processor 18 to determine how much memory can be made available by deleting a particular quality level for a particular stored compressed image at a given resolution.

TABLE 1

|  | Quality Level 1 | Quality Level 2 | Quality Level 3 | Quality Level 4 | Quality Level 5 |
| --- | --- | --- | --- | --- | --- |
| Image 1 | 100 KB | 60 KB | 100 KB | 140 KB | 200 KB |
| Image 2 | 150 KB | 100 KB | 150 KB | 200 KB | 300 KB |
| Image 3 | 80 KB | 40 KB | 75 KB | 100 KB | 150 KB |
| Image 4 | 200 KB | 125 KB | 200 KB | 300 KB | 400 KB |

Referring again to FIG. 3, if the pruning algorithm is successful in freeing up the required memory, the next image is captured (block 160) and compressed at resolution r with $Q^i$ levels of progressive quality (block 170). Prior to the storage of the compressed image, the tagged bytes resulting from the pruning algorithm are deleted to free up the required memory (block 210) and the image is stored in the memory (block 180).

If the "pruning algorithm" is not successful in freeing up the required memory, the user is warned that the memory card is full, and in order to take more pictures, the quality and/or resolution of some of the already stored images should be reduced (block 220). The user then decides if he wishes to reduce the quality and/or resolution of a certain set of images, or totally delete one or more images. The means by which this information is entered into the digital camera 10 (block 230) depends on the camera user interface 42. For example, the user may be given the option of reviewing every image individually to change its resolution and quality setting, or review a group of images with the same resolution to lower their resolution or quality settings, or other alternative approaches might be used.

If the user decides that the images should not be reduced in quality and/or resolution, the digital camera 10 is connected to a PC or another device, for example a host computer, for transferring the images and/or viewing, printing, etc. (block 240). If the user has stored a relatively small number of images on the memory card 30, their stored quality is likely to exceed their initial minimum quality settings. The user may be given the option of downloading only a small file containing the lower quality image, or alternatively, downloading a larger file containing the higher quality image (block 250). Thus, the user can select the quality, resolution, or file size when they download the images to their computer.

In an alternative embodiment, the user can immediately review the images they have captured, and decide to modify the quality setting after the image has been captured, for example, if they take a "great" picture when the camera 10 has been present for a lower quality setting.

Another embodiment of the present invention is directed to minimizing the number of times when the digital camera 10 has to reduce the resolution level and/or the quality level settings. In this embodiment, instead of a single threshold T, two thresholds $T_1$ and $T_2$ are defined. The threshold $T_1$ is similar to the previously defined T and can be set to slightly larger than the memory needed to store an image at the highest resolution and quality level. The threshold $T_2$ is chosen to be much larger, e.g., can be set to a certain percentage of the capacity of the memory card 30 or can be set to several times the value of $T_1$. Threshold $T_2$ is chosen in block 150 in FIG. 3, whereas threshold $T_2$ is used in block 207 in FIG. 5. Threshold $T_2$ can be a fixed value, or alternatively, can be set by the user to correspond to the storage requirements for a selected number of images, e.g., five images at Quality Level 3 at the highest resolution level. Whenever the available memory falls below $T_1$, the pruning algorithm is invoked until the available memory exceeds $T_2$. As a result, the user can take several pictures before the quality levels are adjusted.

One advantage to this alternative embodiment is that it simplifies the memory management of the removable memory card 30 of the digital camera 10. As quality levels are reduced from previously stored images, the available memory will become fragmented. To minimize the time required to store new images and to access these newly stored images, it is useful to defragment the memory card 30, using defragmentation algorithms well known in the art. Preferably, the memory card 30 uses Flash EPROM memory which is organized into memory sectors which can be erased and rewritten in order to defragment the Flash EPROM memory. Since the erasing process takes time and power, it is useful to minimize the number of times this defragmentation occurs. Therefore, it is advantageous to reduce the quality level and/or resolution level of many images in a single operation to defragment the Flash EPROM memory while freeing up substantial memory space to store a significant number of additional images.

Figure 6:
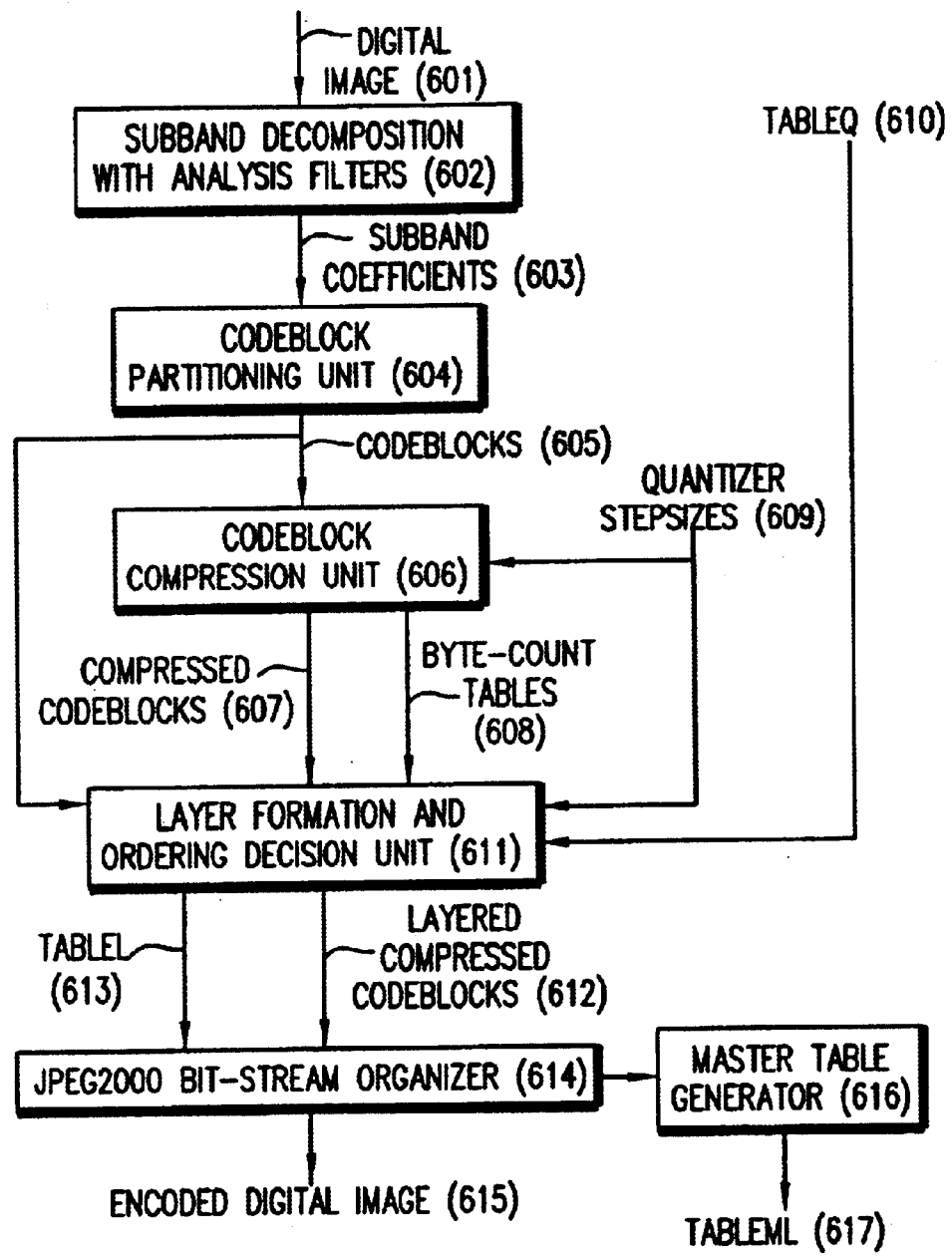
FIG. 6 is a flow diagram of an image encoder according to the present invention.

The compression algorithm will now be explained in more detail. A flow chart of a JPEG2000 image encoder according to the method described in commonly-assigned U.S. patent application Ser. No. 09/579,996 is shown in FIG. 6. A digital image (601) undergoes subband decomposition (602) by the analysis filters to produce an image representation in terms of subband coefficients (603). If the image has multiple components (e.g., RGB), a luminance-chrominance transformation can be applied to convert it to a YCbCr representation, before the subband decomposition step (602). Also, it is possible to divide each component of the image into multiple tiles. But in this preferred embodiment, only a single tile consisting of the entire image is used. The subband coefficients (603) are partitioned into rectangular blocks by the codeblock partitioning unit (604) to produce one or more codeblocks (605). Those skilled in the art would appreciate that partitioning of the subband coefficients is not necessary if only a single codeblock is used. Each codeblock is compressed by the codeblock compression unit (606) using the appropriate quantizer step-size (609) to produce a compressed codeblock (607) and a byte-count table (608). For each codeblock, the compressed bit-stream (607) and the byte-count table, denoted by TableB (608), are fed to a layer formation and ordering decision unit (611). The other inputs to the layer formation and decision unit (611) are the quantizer step-size (609) used to quantize that codeblock and a table, denoted by TableQ (610), containing information about the desired visual quality levels, intended resolution, and viewing condition parameters for the respective visual quality levels. For each codeblock, the layer formation and ordering decision unit (611) determines how many coding passes should be included in each layer, and produces a layered compressed codeblock (612) and a table, denoted by TableL (613). TableL stores information about the number of coding passes and the corresponding bytes in each layer for that codeblock. The layer formation and ordering decision unit (611) also specifies that the overall bit-stream is to be arranged in a layer-progressive manner. The layered compressed codeblocks (612), TableL (613), and the ordering information are fed to the JPEG2000 bit-stream organizer (614) to produce an encoded digital image (615) that is JPEG2000 compliant. The master table generator (616) generates TableML (617) whose $i^{th}$ entry specifies the number of bytes required to represent the compressed image data corresponding to the first i layers. This information is also contained in the compressed bit-stream, but in some applications it may be advantageous to store the information separately so that it is not necessary to parse the bit-stream for the information.

Figure 7:
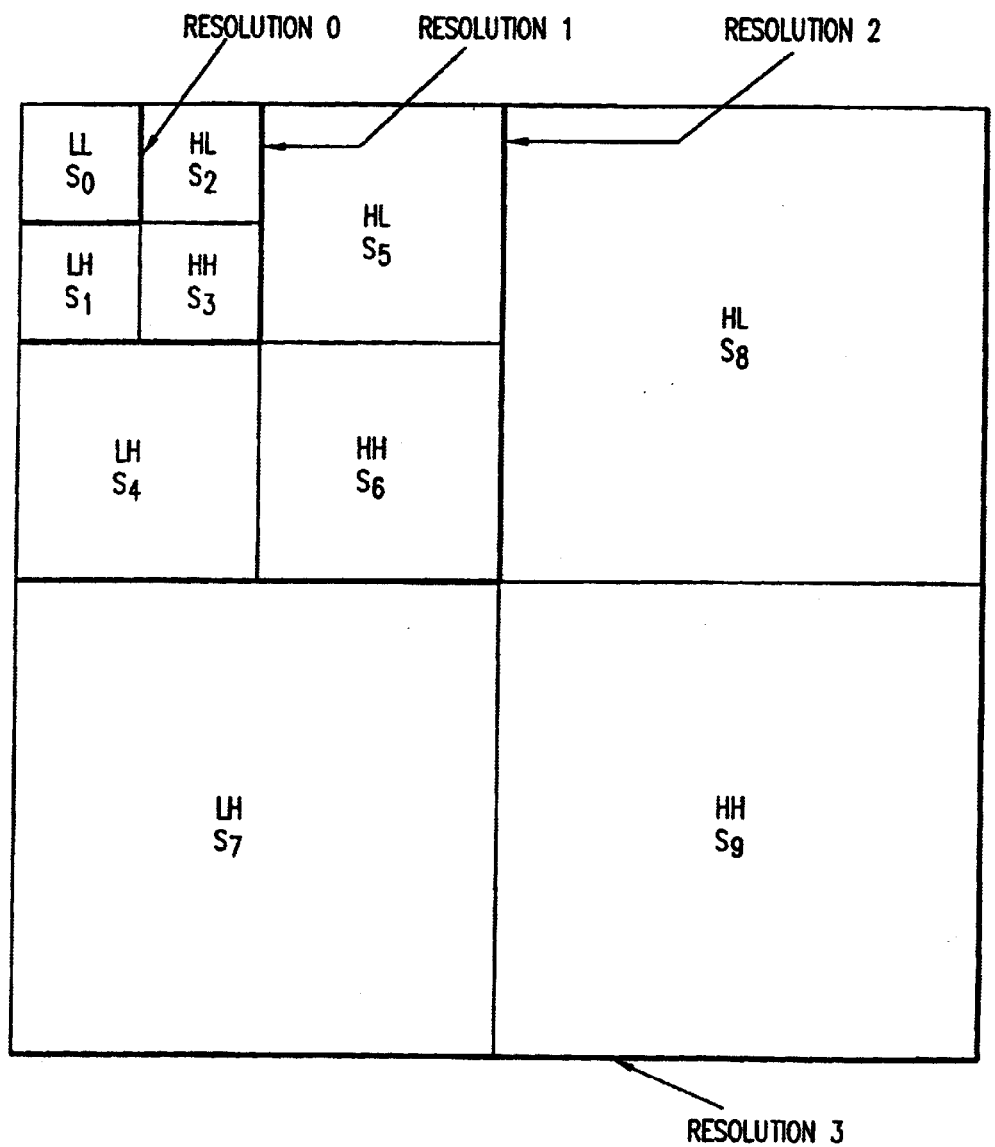
FIG. 7 shows a resolution hierarchy created by a 3-level octave subband decomposition.

The blocks in FIG. 6 will now be described in greater detail. The image undergoes subband decomposition by analysis filters (602). A single level of decomposition splits the image into 4 subbands, denoted by LL, HL, LH, and HH. The first letter indicates the type of filtering employed in the horizontal direction. The second letter indicates the type of filtering employed in the vertical direction. For example, band HL is the result of high-pass filtering in the horizontal direction and low-pass filtering in the vertical direction. In an octave decomposition, the LL band is split recursively. In the preferred embodiment, an R level octave decomposition is used. FIG. 7 shows an example of a 3 level octave decomposition. The subbands are numbered from the lowest frequency to the highest frequency. An R level decomposition generates (R+I) resolutions and (3R+1) subbands, denoted by $S_0, S_1, \ldots S_{3R}$. An image at resolution r (0<r<R) can be reconstructed from subbands $S_0, S_1, \ldots, S_{3r}$. If the original image is of size 1024 by 1024, and the decomposition is 3 level octave, images at resolutions 0, 1, 2 and 3 have sizes 128×128, 256×256, 512×512, and 1024×1024, respectively.

Figure 8:
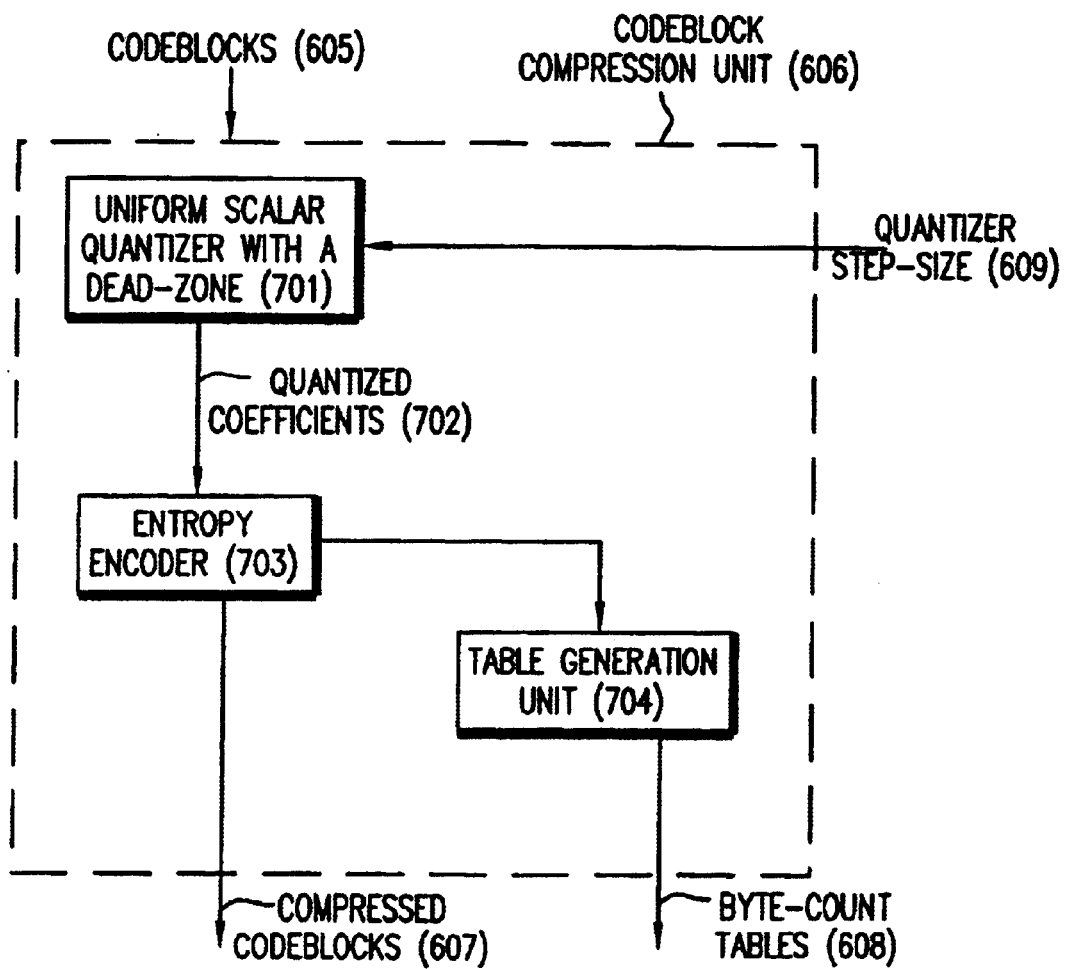
FIG. 8 is a block diagram of the "codeblock compression unit" of FIG. 6.

The codeblock partitioning unit (604) shown in FIG. 6 partitions each subband into a number of rectangular codeblocks. The codeblock compression unit (606) is shown in greater detail in FIG. 8. Each codeblock is quantized with a scalar quantizer (701) to produce a sign-magnitude representation of the indices of quantized coefficients (702).

Figure 9A:
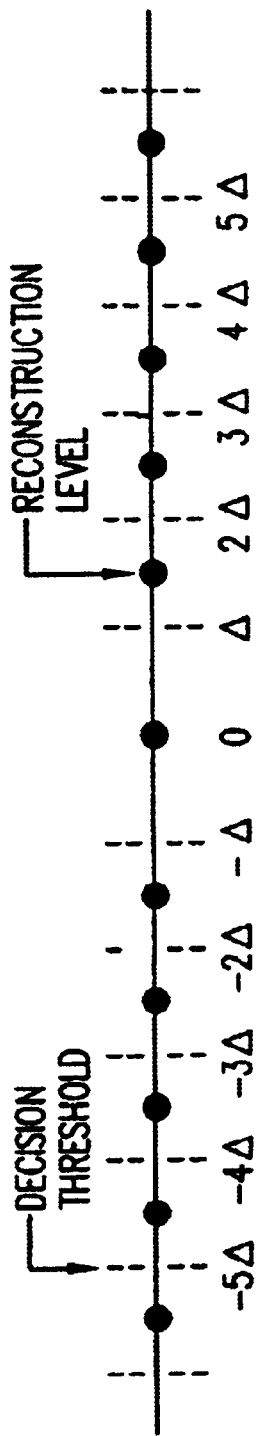
FIGS. 9A and 9B show graphs of the decision thresholds and reconstruction levels for step-sizes of $\Delta$ and $2\Delta$, respectively, for a uniform scalar quantizer with a dead-zone.
Figure 9B:
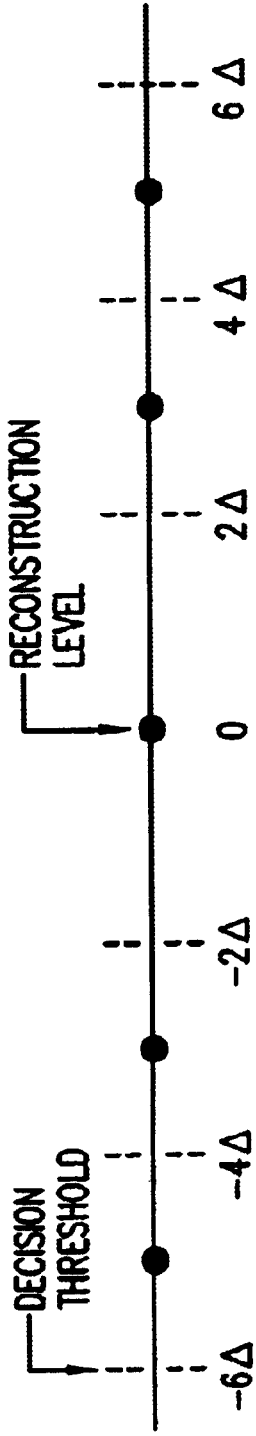

Preferably, a uniform scalar quantizer with a dead-zone is used. The decision thresholds and reconstruction levels for this quantizer are shown in FIGS. 9A and 9B. FIG. 9A shows the decision thresholds and reconstruction levels for a step-size of $\Delta$; FIG. 9B shows the decision thresholds and reconstruction levels for a step-size of $2\Delta$. In a preferred embodiment, the reconstruction levels are always at the center of the quantization interval. But those skilled in the art will recognize that this is not necessary. For example, the reconstruction levels can be biased towards zero. The same base quantizer step-size is used for all the codeblocks in a given subband. Let the step-size for subband i be $\Delta_i$. It should be noted that the maximum quantization error, denoted by $E_{max}$, is $(\Delta_i/2)$, except for the zero bin which has a maximum quantization error of $\Delta_i$. If the subband analysis and synthesis filters are reversible, the quantization step may be entirely absent.

Suppose that the codeblock being processed is from subband i. Then, the samples from the block are quantized with a uniform scalar quantizer with step size $\Delta_i$ as described above. Suppose that the magnitude of the indices of quantized coefficients is represented by a fixed precision of $A_i$ bits. Let the bits be indexed as 1, 2, . . . , $A_i$, where index 1 corresponds to the most significant bit (MSB) and $A_i$ corresponds to the least significant bit (LSB). The $k^{th}$ bit-plane for the codeblock consists of the $k^{th}$ bit from the magnitude representation of all the indices of quantized coefficients from that codeblock. One interesting property of the scalar quantizer being used is that discarding, or zeroing out, the k least significant bits from the magnitude representation of the index of a quantized coefficient from subband i is equivalent to scalar quantization of that coefficient with a step-size of $2^k \Delta_i$. Thus, if the compressed bit-stream corresponding to the codeblock is truncated so that the data corresponding to the last k bit-planes is discarded, it is possible to reconstruct a more coarsely quantized version of the codeblock. This is known as the embedding property. It should be noted that if the last k bit-planes of the magnitude representation of a quantized coefficient are dropped, for reconstruction at the decoder, the reconstruction levels for the quantizer with a step-size of $2^k \Delta_i$ are used.

For the purpose of entropy coding, a bit-plane for a codeblock is said to be significant if any of the previous bit-planes were significant or the bit-plane has at least one non-zero bit. The entropy encoder (703) codes each bit-plane for the codeblock in one or more coding passes. For example, the most significant bit-plane is encoded using a single coding pass. The rest of the bit-planes for the codeblock are encoded using three coding passes. In JPEG2000, the MQ arithmetic coder is used as the entropy coder. The table generation unit (704) generates a byte-count table (608) for each codeblock. The $m^{th}$ entry in the table corresponds to the number of bytes needed to include coding passes 1, 2, . . . , m of the codeblock in the bit-stream.

The layer formation and ordering decision unit (611) determines the number of coding passes to be included in each layer so that the visual quality criteria as specified by TableQ (610) are met. TableQ (610) stores information about the desired visual quality levels. The $1^{st}$ column entry of the $j^{th}$ row, TableQ[j][1], specifies the resolution at which the image at visual quality level j will be stored. The $2^{nd}$ column entry, TableQ[j][2], specifies the viewing condition parameters applicable for visual quality level j. As will be described shortly, the viewing condition parameters determine the effective quantizer step-size to be used in each subband and thus, determine the visual quality level for the reconstructed image. The number of layers, L, for each codeblock is equal to the number of visual quality levels in TableQ.

For a given visual quality level and the corresponding viewing condition parameters, for each subband, the layer formation and ordering decision unit (611) calculates the quantizer step-size that will result in just noticeable distortion in the reconstructed image. This is accomplished by using the two-dimensional Contrast Sensitivity Function (CSF) of the human visual system (HVS). The CSF model described in Jones et al., "Comparative study of wavelet and DCT decomposition with equivalent quantization and encoding strategies for medical images", *Proc. SPIE Medical Imaging '95*, vol. 2431, pp. 571–582, which is incorporated herein by reference, models the sensitivity of the human visual system as a function of the two-dimensional (2-D) spatial frequency, and it depends on a number of parameters, such as viewing distance, light level, color, image size, eccentricity, noise level of the display, etc. These parameters will be referred to as viewing condition parameters. The frequency dependence of the CSF is commonly represented using cycles/degree of visual subtense. The CSF can be mapped to other units, such as cycles/mm, for a given viewing distance (i.e., the distance from the observer to the displayed image).

The 2-D CSF value for subband i is denoted by $CSF(F_i, VC)$, where VC refers to the viewing condition parameters which include the intended viewing distance, the ambient light level, the display noise level, and the dots per inch for the display. $F_i$ represents the 2-D spatial frequency (in cycles/mm) associated with subband i. In a preferred embodiment, $F_i$ is chosen to be the center of the frequency range nominally associated with subband i. As described in the Jones et al. paper, if subband i is quantized with a uniform scalar quantizer having a dead-zone, the step-size $Q_i(VC)$ that results in just noticeable distortion in the reconstructed image for viewing condition parameters VC is $$Q_i(VC) = \frac{1}{C \times MTF(F_i) \times G_i \times CSF(F_i, VC)},$$

where $MTF(F_i)$ is the display MTF at frequency $F_i$, C is the contrast per code-value of the display device, and $G_i$ is the gain factor that represents the change in contrast for the reconstructed image for one code-value change in a coefficient of subband i. The gain factor depends on the level and orientation of the subband, as well as the subband synthesis filters. Compared to the paper by Jones et al, a factor of 0.5 is missing from the denominator. This is due to the fact that for uniform scalar quantizer with a dead-zone, the maximum possible distortion, $E_{max}$, is equal to the step-size, as opposed to half the step-size for a uniform scalar quantizer in the absence of a dead-zone. The viewing condition parameters are pre-specified for each visual quality level.

Now consider a codeblock from subband i quantized with a step-size $\Delta_i$. Suppose that m coding passes for the codeblock are included in the compressed bit-stream, and the codeblock is reconstructed from the m coding passes. Let $E_{max}$ be the maximum absolute difference between the original codeblock and the reconstructed codeblock. The codeblock can be thought of as being quantized by a uniform scalar quantizer with a dead-zone having a step-size of $E_{max}$. In this case the effective step-size is $E_{max}$. Let us assume that for the codeblock from subband i, $P_{(j-1)}$ coding passes have been included in coding layers 1, 2, . . . , (j−1), and we are trying to determine the number of coding passes to be included in layer j so that the visual quality level j is attained (or exceeded) by including the first j layers in the bit-stream. The quantizer step-size $Q_i(VC_j)$ that results in just noticeable distortion in the reconstructed image is calculated. Here $VC_j$ refers to the viewing condition parameters at visual quality level j. Then, for coding passes $P_{(j-1)}$, $P_{(j-1)}+1$, . . . etc., the effective quantizer step-size is calculated. Suppose that at pass m, the effective quantizer step-size becomes less than or equal to $Q_i(VC_j)$, then $P_j$ is set to m. This means that $(m-P_{(j-1)})$ additional coding passes are required in the $j^{th}$ layer of that codeblock. This process is repeated for each codeblock from each subband, and for each visual quality level.

It is possible that some layers in a codeblock may contain no data. For example, consider that an image is to be stored at visual quality level 3, and let the corresponding resolution be r. Now, for a codeblock from subband i, we would like to determine the number of coding passes to be included in layer 3. As described previously, if i is greater than 3r, subband i is not necessary to reconstruct the image at resolution r. So no data is included in layer 3 of codeblocks belonging to subband i.

Figure 10:
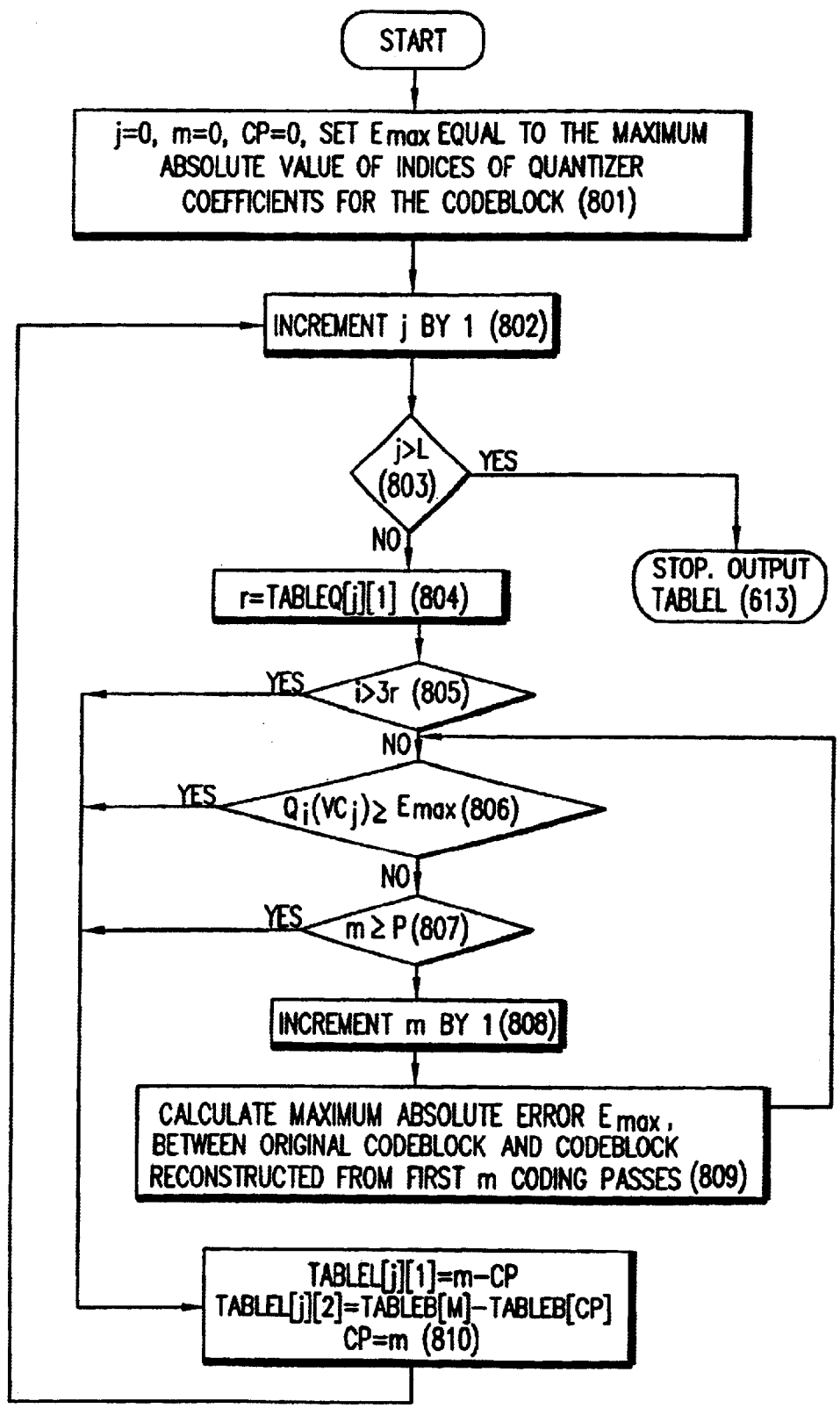
FIG. 10 is a flow diagram of the "layer formation and ordering decision unit" of FIG. 6.

A flow chart for the layer formation and ordering decision unit (611) is shown in FIG. 10. Let the number of layers for the codeblock be L, and the total number of coding passes for the codeblock be P. The inputs to the layer formation and ordering decision unit are: 1) The visual quality table, TableQ (610), with L entries, 2) the original codeblock (605), 3) the compressed bit-stream corresponding to that codeblock (607), and 4) the byte-count table, denoted by TableB (608) for the codeblock. The layer formation and ordering unit (611) generates a table, denoted by TableL (613), that has L rows and 2 columns. The $1^{st}$ entry from row j denotes the number of coding passes belonging to layer j, and the $2^{nd}$ entry indicates the number of bytes in layer j of that codeblock.

The initializer unit (801) initializes j, m, and the number of cumulative passes, CP, to zero. It also initializes the maximum absolute error, $E_{max}$, to the maximum absolute value of the indices of quantized coefficients for that codeblock. In step (802), j is incremented by 1. Then, the comparison unit (803) compares j against the number of layers, L. If j is greater than L, all the layers have been formed, and the process is stopped after writing out TableL (613). Otherwise, the process is continued. In step (804), the resolution r is set to TableQ[j][1]. A second comparison unit (805) compares the index of the subband to which the codeblock belongs, i, with 3r. If i is greater than 3r, subband i is not needed to reconstruct the image at resolution r. The flow-control is passed to step (810) and the $j^{th}$ row of TableL is set to 0. This signifies that no coding passes from the codeblock are included in layer j. If i is less than or equal to 3r, another comparison unit (806) compares $E_{max}$ with the quantizer step-size, $Q_i(VC_j)$, that produces just noticeable distortion for viewing condition parameters corresponding to visual quality level j. If $E_{max}$ is less than or equal to $Q_i(VC_j)$, the flow-control passes to step (810), and all coding passes up to and including m are included in layer j. Otherwise, m is compared against the total number of passes, P (807). If m is greater than or equal to P, the flow-control skips to step (810). Otherwise, m is incremented by 1 (808). Then, the codeblock is reconstructed by using compressed data corresponding to the first m coding passes, and the maximum absolute difference, $E_{max}$, between the original codeblock and the reconstructed codeblock is found (809). After this, the flow-control returns to step (806). In step (810), TableL[j][1] is set to (m-CP) and TableL[j][2] is set to (TableB[m]-TableB[CP]). Also, the number of cumulative passes is set to m. Then, the flow-control returns to step (802).

It should be noted that the step-size used to quantize the codeblock should be sufficiently small so that when all the coding passes for the codeblock are included in the bit-stream, the maximum quality level specified in the visual quality table, TableQ (610), can be achieved or exceeded.

Computer programs or software in accordance with the present invention can be stored on a computer readable medium. The computer readable storage medium may comprise, for example, magnetic storage media such as magnetic disc (such as a floppy disc) or magnetic tape, optical storage media such as optical disc, optical tape, or machine readable bar code, solid state electronic storage devices such as random access memory (RAM) or read only memory (ROM), or any other physical device or medium employed to store a computer program.

Further modification and variation can be made to the disclosed embodiments without departing from the subject and spirit of the invention as defined in the following claims. Such modifications and variations, as included within the scope of these claims, are meant to be considered part of the invention as described. For example, although the present invention has been described with reference to embedded quantization (such as with JPEG2000), it would be understood that other compression algorithms can be utilized. For example, the captured images can be compressed using the current JPEG algorithm (ITU-T Recommendation T.81) at a specific resolution level and/or quality level. To free up space for storing additional images in accordance with the present invention, one or more of the stored images can be decompressed and then recompressed at a lower resolution level and/or quality level. Alternatively, the JPEG image can be compressed to a smaller file size by decoding and requantizing the DCT coefficients using a coarser quantizer which corresponds to a lower quality level.

Parts List 10 digital camera
12 zoom lens
14 zoom and focus motor drives
18 image sensor
20 clock drivers
22 control processor and timing generator circuit
24 autofocus and autoexposure detectors
26 flash
28 analog signal processor and analog-to-digital converter circuit
30 removable memory card
32 DRAM buffer memory
34 processor
36 Flash EPROM
38 RAM memory
40 color image display
42 camera user interface
44 digital-to-analog converter
46 miniature speaker
48 video output driver
50 TV display
52 host computer
54 interface cable
56 host interface

What is claimed is:

1. A method for selectively adjusting the file size of digital images stored in a memory of a digital camera having a predetermined memory space, comprising the steps of:

(a) capturing a first image and storing the captured first image using a specific file size, the captured first image being compressed prior to storage;

(b) adjusting the file size of the stored first image based on the available memory space in the digital camera memory so that a subsequent captured image can be stored; and (c) capturing a subsequent image and storing the captured subsequent image with the adjusted first image, (d) wherein the compressed first image is organized into a plurality of quality layers, and wherein one or more of such quality layers can be deleted to reduce the file size of the compressed first image and thereby increase the available digital camera memory space.

2. The method of claim 1 wherein the first image is compressed using embedded quantization.

3. The method of claim 2 wherein the first image is compressed in accordance with JPEG2000.

4. The method of claim 1 wherein the amount of memory space required to store each of the plurality of quality layers is stored in a table accessible by the digital camera.

5. The method of claim 1 wherein the compressed first image is organized into a plurality of resolution layers and quality layers and wherein one or more of such resolution layers and quality layers can be deleted to reduce the file size of the compressed first image and thereby increase the available digital camera memory space.

6. The method of claim 5 wherein the amount of memory space required to store each of the plurality of resolution layers and quality layers is stored in a table accessible by the digital camera.

7. A method for selectively adjusting the quality levels of digital images stored in a memory of a digital camera having a predetermined memory space in a range from a minimum acceptable quality level to the highest quality level, comprising the steps of:

(a) storing images at the highest quality level until the available memory space does not permit the storage of a subsequent image at the highest quality level;

(b) reducing the quality level of at least one of the stored images so that the available memory space is capable of storing a subsequent captured image at the minimum acceptable quality level; and (c) capturing a subsequent image and storing the captured subsequent image at a quality level within the quality level range; and (d) indicating to a camera user that the subsequent captured image cannot be stored unless the minimum acceptable quality level is reduced for one or more stored images.

8. The method of claim 7 wherein a user selects the minimum acceptable quality level for each image to be stored, and wherein the reducing step includes first reducing the quality levels of the stored images having the highest differential between the user selected minimum acceptable quality level and the stored quality level.

9. The method of claim 7 wherein the available memory space is adjusted to provide for the storage of more than one subsequent captured image.

10. A method for selectively adjusting the resolution levels or the quality levels of digital images stored in a memory of a digital camera having a predetermined memory space, comprising the steps of:

(a) capturing a first image and storing the captured first image at a specific resolution level or quality level, wherein the stored first image is organized into a plurality of quality layers;

(b) after capturing a subsequent image, adjusting the resolution level or quality level of the stored first image by deleting one or more of the plurality of quality levels so that the captured subsequent image can be stored; and (c) storing the captured subsequent image with the adjusted first image.

11. The method of claim 10 wherein the first image is compressed using embedded quantization.

12. The method of claim 11 wherein the first image is compressed in accordance with JPEG2000.

13. A method for selectively adjusting the file size of digital images stored in a memory of a digital camera having a predetermined memory space, comprising the steps of:

(a) capturing a first image and storing the captured first image using a specific file size, the captured first image being compressed prior to storage;

(b) after capturing a subsequent image, adjusting the file size of the stored first image based on the available memory space in the digital camera memory so that the captured subsequent image can be stored; and (c) storing the captured subsequent image with the adjusted first image, (d) wherein the compressed first image is organized into a plurality of quality layers, and wherein one or more of such quality layers can be deleted to reduce the file size of the compressed first image and thereby increase the available digital camera memory space.

14. The method of claim 13 wherein the first image is compressed using embedded quantization.

15. The method of claim 14 wherein the first image is compressed in accordance with JPEG2000.

16. The method of claim 13 wherein the amount of memory space required to store each of the plurality of quality layers is stored in a table accessible by the digital camera.

17. The method of claim 13 wherein the compressed first image is organized into a plurality of resolution layers and quality layers and wherein one or more of such resolution layers and quality layers can be deleted to reduce the file size of the compressed first image and thereby increase the available digital camera memory space.

18. The method of claim 17 wherein the amount of memory space required to store each of the plurality of resolution layers and quality layers is stored in a table accessible by the digital camera.

19. A method for selectively adjusting the quality levels of digital images stored in a memory of a digital camera having a predetermined memory space in a range from a minimum acceptable quality level to the highest quality level, comprising the steps of:

(a) storing images at the highest quality level until the available memory space does not permit the storage of a subsequent image at the highest quality level;

(b) after capturing such subsequent image, reducing the quality level of at least one of the stored images so that the available memory space is capable of storing the subsequent captured image at the minimum acceptable quality level; and (c) storing the subsequent image at a quality level within the quality level range;

(d) wherein a user selects the minimum acceptable quality level for each image to be stored, and wherein the reducing step includes first reducing the quality levels of the stored images having the highest differential between the user selected minimum acceptable quality level and the stored quality level.

20. The method of claim 19 wherein the available memory space is adjusted to provide for the storage of more than one subsequent captured image.

21. The method of claim 19 further including the step of indicating to a camera user that the subsequent captured image cannot be stored unless the minimum acceptable quality level is reduced for one or more stored images.

22. A method for adjusting the file size of digital images stored in a memory of a digital camera, comprising:
   (a) capturing an image;
   (b) compressing the captured image to produce a compressed image;
   (c) organizing the compressed image into a first image file including a plurality of quality layers and having a first image file size;
   (d) storing the first image file in the memory of the digital camera;
   (e) deleting at least one of the plurality of quality layers from the first image file to reduce the size of the stored first image file;
   (f) capturing a subsequent image;
   (g) compressing the subsequent image to produce a compressed subsequent image; and
   (h) storing the compressed subsequent image in the memory of the digital camera.

23. The method of claim 22 wherein the captured image is compressed using embedded quantization.

24. The method of claim 22 wherein the captured image is compressed in accordance with JPEG2000.

25. The method of claim 22 wherein the amount of memory space required to store each of the plurality of quality layers is stored in a table accessible by the digital camera.

26. The method of claim 22 wherein the first image file is organized into a plurality of resolution layers and quality layers, and wherein one or more of such resolution layers and quality layers can be deleted to reduce the file size of the first image file.

27. The method of claim 26 wherein the amount of memory space required to store each of the plurality of resolution layers and quality layers is stored in a table accessible by the digital camera.

* * * * *